United States Patent
Almohisn et al.

(10) Patent No.: US 12,534,662 B2
(45) Date of Patent: Jan. 27, 2026

(54) LOST CIRCULATION COMPOSITE MATERIALS AND METHODS AND SYSTEMS RELATED THERETO

(71) Applicant: SAUDI ARABIAN OIL COMPANY, Dhahran (SA)

(72) Inventors: Ayman Almohisn, Dhahran (SA); Bader G. Alharbi, Dhahran (SA); Mohammed K. Arfaj, Dhahran (SA); Aqeel K. Alshakhouri, Al Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/471,784

(22) Filed: Sep. 21, 2023

(65) Prior Publication Data

US 2025/0101290 A1    Mar. 27, 2025

(51) Int. Cl.
*C09K 8/487*    (2006.01)

(52) U.S. Cl.
CPC .......... *C09K 8/487* (2013.01); *C09K 2208/10* (2013.01)

(58) Field of Classification Search
CPC .......... C09K 8/03; C09K 8/032; C09K 8/467; C09K 8/487; C09K 2208/10; E21B 33/00; E21B 33/13
See application file for complete search history.

(56) References Cited

U.S. PATENT DOCUMENTS

| | | | |
|---|---|---|---|
| 6,976,537 B1* | 12/2005 | Verret | C09K 8/40 |
| | | | 507/214 |
| 10,113,406 B1* | 10/2018 | Gomaa | C09K 8/703 |
| 10,655,050 B1 | 5/2020 | Wagle et al. | |
| 11,104,838 B2 | 8/2021 | Bataweel et al. | |
| 11,203,710 B2 | 12/2021 | Wagle et al. | |
| 11,299,662 B2 | 4/2022 | Wagle et al. | |
| 11,578,543 B2 | 2/2023 | Almohsin et al. | |
| 2010/0036017 A1* | 2/2010 | Eoff | C09K 8/514 |
| | | | 523/130 |
| 2010/0224366 A1* | 9/2010 | Lende | C04B 28/02 |
| | | | 166/292 |

(Continued)

FOREIGN PATENT DOCUMENTS

WO    WO-2022005962 A1 *    1/2022    ........... C09K 8/5045

OTHER PUBLICATIONS

Ma et al., Research progress on properties of pre-gelatinized starch and its application in wheat flour products, 2022, Grain & Oil Science Technology, 5, 87-97 (Year: 2022).*

(Continued)

*Primary Examiner* — Angela M DiTrani Leff
(74) *Attorney, Agent, or Firm* — Vorys, Sater, Seymour and Pease, LLP

(57) ABSTRACT

Compositions, methods and systems including a composite lost circulation material (CLCM) composition. The CLCM composition includes a colloidal nanosilica component having nanosilica particles and a nanosilica carrier fluid; a temperature-controlled activator component having a temperature-controlled activator and an activator carrier fluid, wherein the temperature-controlled activator is activatable under formation temperature conditions at a zone of interest in a wellbore in a subterranean formation; and polymer gel particles.

9 Claims, 7 Drawing Sheets

(56) References Cited

U.S. PATENT DOCUMENTS

| | | | | |
|---|---|---|---|---|
| 2011/0094746 A1* | 4/2011 | Allison | ............... | C09K 8/424 |
| | | | | 166/308.5 |
| 2018/0327649 A1* | 11/2018 | Kalgaonkar | ........... | C09K 8/426 |
| 2022/0010193 A1* | 1/2022 | Wagle | ............... | C09K 8/5045 |
| 2022/0363970 A1 | 11/2022 | Hamza et al. | | |
| 2023/0193112 A1 | 6/2023 | Wagle et al. | | |

OTHER PUBLICATIONS

Nadeau et al., The "Golden Zone" temperature distribution of oil and gas occurrence examined using a global empirical database, 2023, Marine and Petroleum Geology, 158 (Year: 2023).*

Musaab Magzoub, Saeed Salehi, Guoqiang Li, Jizhou Fan, Catalin Teodoriu, Loss circulation prevention in geothermal drilling by shape memory polymer, Geothermics, vol. 89, 2021, 101943.

* cited by examiner

LOST CIRCULATION COMPOSITE MATERIALS AND METHODS AND SYSTEMS RELATED THERETO

FIELD OF THE DISCLOSURE

The present disclosure relates generally to lost circulation materials and related methods and systems; more particularly, the present disclosure relates to composite lost circulation materials comprising a colloidal nanosilica component, a temperature-controlled activator component, and a polymer gel particle component, and methods and systems related thereto.

BACKGROUND OF THE DISCLOSURE

The production of crude oil and other hydrocarbons starts with the drilling of a wellbore through a subterranean formation and into a hydrocarbon reservoir. Drilling of a wellbore involves circulating a drilling fluid (or drilling mud) from a surface location of the wellbore to a downhole location through a drill string. The drilling fluid exits through ports (or jets) in a drill bit, which bores through the formation and forms the wellbore. During drilling, the fluid picks up cuttings and carries the cuttings up an annulus formed between an inner wall of the wellbore and an outer wall of the drill string. The drilling fluid and the cuttings flow through the annulus to the surface, where the cuttings are separated from the fluid. The remaining drilling fluid may be treated with chemicals and re-pumped into the wellbore for additional drilling operations or other treatment operations.

Lost circulation can be encountered when drilling fluid (also referred to as drilling mud) pumped into a well returns partially or does not return to the surface. While some fluid loss is expected, excessive fluid loss is not desirable from a safety, economical, or environmental standpoint. Lost circulation is associated with problems including well control, borehole instability, pipe sticking, unsuccessful production tests, poor hydrocarbon production after well completion, and formation damage due to plugging of pores and pore throats by mud particles and/or cuttings. In extreme cases, lost circulation problems may force abandonment of a well.

Lost circulation can occur in various subterranean formations, such as naturally fractured formations, cavernous formations, and highly permeable formations (e.g., formations having a permeability greater than 500 millidarcy). Lost circulation can be categorized by a rate of drilling fluid lost as during a drilling operation. A rate of loss of 1 to 10 barrels per hour (bbl/h) is characterized as seepage-loss lost circulation that may occur in any formation; a rate of loss of to less than 500 bbl/h is characterized as moderate-loss lost circulation that may occur in porous formations or those having relatively small natural or induced fractures; and a rate of loss of equal to or greater than 500 bbl/h is characterized as severe-loss lost circulation that may occur in highly permeable formations or those having relatively large natural or induced fractures. Severe-loss lost circulation may include total loss; severe-loss lost circulation can result in complete abandonment of a well.

The extent of the fluid loss and the ability to control the lost circulation with a lost circulation material depends on a number of factors including, for example, the composition and properties (e.g., porosity, permeability, and the like) of the formation in which drilling is performed, the drilling fluid pressure applied during drilling (i.e., overbalanced pressure can cause fluid to seep into the formation or open fractures/fissures therein), and the like, and any combination thereof.

One method that has been developed to control lost circulation involves the placement of lost circulation materials into a lost circulation zone (i.e., the sections of a formation into which drilling fluid may be lost). Conventional lost circulation materials may include fibrous, lamellated, or granular materials. The lost circulation materials may be placed into the formation, inter alia, as part of a drilling fluid or as a separate lost circulation pill in an attempt to control and/or prevent lost circulation. However, given the growing complexity associated with wellbore drilling in various subterranean formation types, conventional lost circulation materials may be less effective or otherwise exhibit various shortcomings.

In view of the aforementioned, the present disclosure provides an ecologically and economically friendly lost circulation material for controlling lost circulation during drilling of a wellbore.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method is provided including pre-mixing a composite lost circulation material (CLCM) composition, wherein the CLCM composition comprises: a colloidal nanosilica component, the colloidal nanosilica component comprising nanosilica particles and a nanosilica carrier fluid; a temperature-controlled activator component, the temperature-controlled activator comprising a temperature-controlled activator and an activator carrier fluid; and polymer gel particles, wherein the pre-mixing causes the polymer gel particles to swell; introducing the CLCM composition to a zone of interest in a subterranean formation via a wellbore, the zone of interest comprising a lost circulation zone; and heating the CLCM composition at the zone of interest under formation temperature conditions, thereby activating the temperature-controlled activator in the temperature-controlled activator component and forming a gelled solid to mitigate the flow of fluids from the wellbore into the subterranean formation at the zone of interest.

In another embodiment consistent with the present disclosure, a composite lost circulation material (CLCM) composition is provided including a colloidal nanosilica component, the colloidal nanosilica component comprising nanosilica particles and a nanosilica carrier fluid; a temperature-controlled activator component, the temperature-controlled activator comprising a temperature-controlled activator and an activator carrier fluid, wherein the temperature-controlled activator is activatable under formation temperature conditions at a zone of interest in a wellbore in a subterranean formation; and polymer gel particles.

In a further embodiment consistent with the present disclosure, a system is provided including a wellbore in a subterranean formation comprising a zone of interest; a pre-mixed composite lost circulation material (CLCM) composition disposed at the zone of interest, the CLCM composition comprising: a colloidal nanosilica component, the colloidal nanosilica component comprising nanosilica particles and a nanosilica carrier fluid; a temperature-controlled activator component, the temperature-controlled activator comprising a temperature-controlled activator and an activator carrier fluid, and wherein the temperature-controlled activator activates under formation temperature conditions at the zone of interest; and polymer gel particles.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
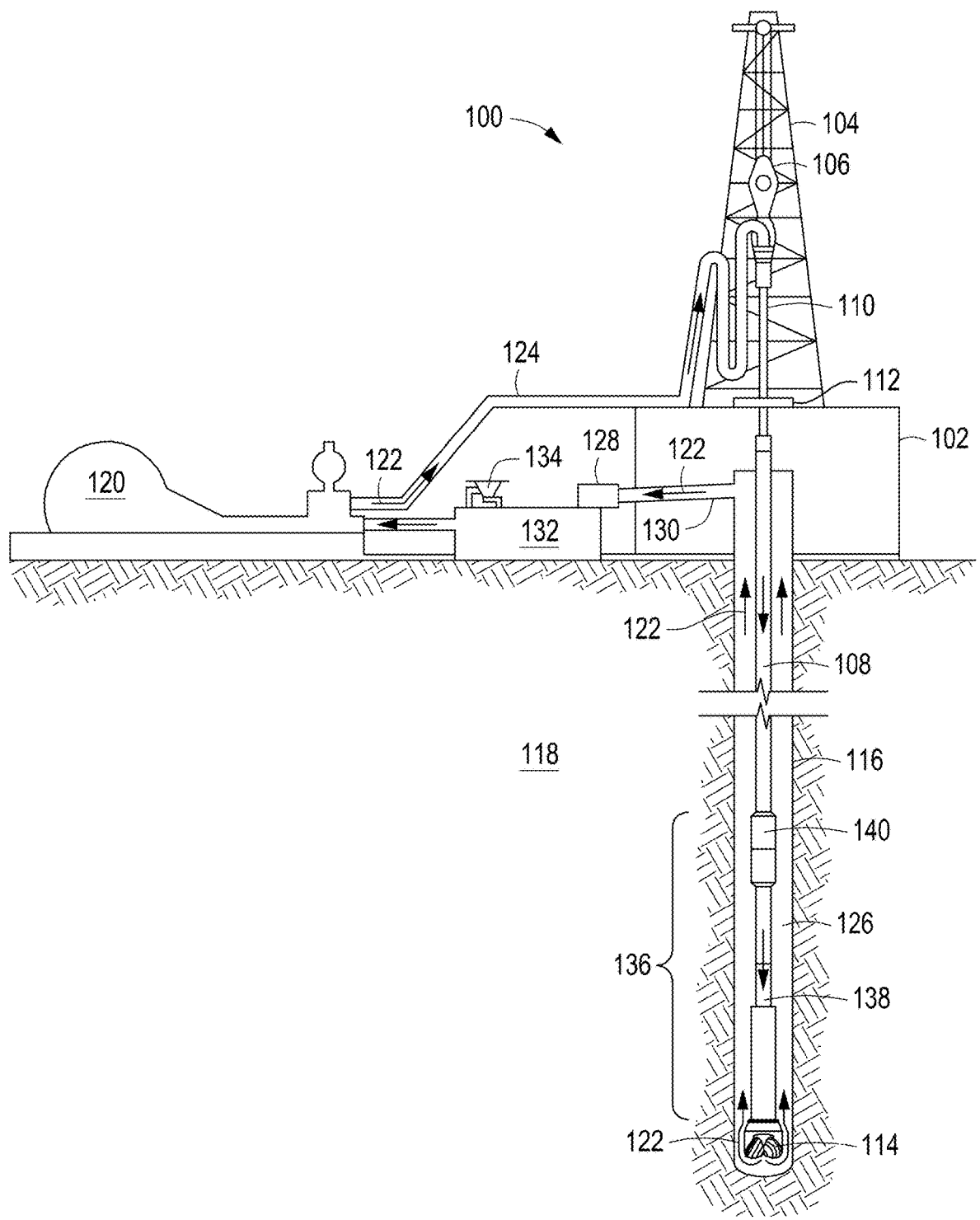
FIG. 1 is a cross-sectional side view of an example well system that may incorporate one or more principles of the present disclosure.

Embodiments and examples of the present disclosure will be described in detail with reference to accompanying Figures. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to lost circulation materials and related methods and systems for controlling lost circulation in a subterranean formation. As used herein, the term "lost circulation," and grammatical variants thereof, refers to a reduction or total absence of fluid flow to the surface from a wellbore due to a subterranean formation through which the wellbore is drilled. More specifically, the present disclosure relates to composite lost circulation materials ("CLCM") comprising three main components of colloidal nanosilica, temperature-controlled activator, and polymer gel particles, and methods and systems related thereto.

As described in detail below, the CLCM compositions of the present disclosure are prepared by mixing at least the three main components of the CLCM: the colloidal nanosilica, the temperature-controlled activator, and the polymer gel particles. The polymer gel particles are a dry powder and swell upon mixing with the colloidal nanosilica and the temperature-controlled activator, thereby resulting in a CLCM gel dispersion with swelled polymer gel particles. The CLCM gel dispersion forms a single pumpable structure (e.g., in the form of a pill), wherein the polymer gel particles are spaced apart as a result of the swelling and presence of the colloidal nanosilica and/or temperature-controlled activator is dispersed within the interstitial spaces between one or more polymer gel particles.

When introduced into a zone of interest in a subterranean formation through a wellbore and heated (i.e., under formation temperature conditions), the temperature-controlled activator is activated and destabilizes the nanosilica particles in the colloidal nanosilica of the CLCM gel dispersion, resulting in a rigid, solid gel composition (a CLCM gel solid) that provides prevention or reduction of lost circulation in the subterranean formation. The prevention or reduction of lost circulation can be up to and include 100% (see Examples below).

Accordingly, as used herein, the terms "CLCM gel dispersion" or "CLCM gel dispersion form," and grammatical variants thereof, refer to the CLCM composition comprising the mixture of the colloidal nanosilica, the temperature-controlled activator, and the polymer gel particles prior to activation of the temperature-controlled activator. As used herein, the terms "CLCM gel solid" or "CLCM gel solid form," and grammatical variants thereof, refer to the CLCM composition comprising the mixture of the colloidal nanosilica, the temperature-controlled activator, and the polymer gel particles after activation of the temperature-controlled activator under formation temperature conditions. As used herein, the term "CLCM composition," refers interchangeably to the CLCM gel dispersion and the CLCM gel solid; that is, the term CLCM composition encompasses at least the three main components of colloidal nanosilica, temperature-controlled activator, and polymer gel particles. It is further to be appreciated that the order in which the at least three components are mixed is not limited and may be in any order; however, the combination of all three is required to swell the polymer gel particles before being introduced to a lost circulation zone(s) in a wellbore in a subterranean formation (e.g., as a pill).

Without being bound by theory, it is believed that the activation of the temperature-controlled activator results in weakened repulsive interactions between the nanosilica particles, leading to collisions within the CLCM composition. These collisions result in the aggregation of the nanosilica particles into long chain-like networks (e.g., caused by the formation of siloxane (Si—O—Si) bonds and re-associate (aggregate) the polymer gel particles (i.e., reduce or eliminate interstitial spaces between the one or more polymer gel particles, which remain in a swelled state and can bond or otherwise associate together). As used herein, the term "re-association," and grammatical variants thereof, with reference to the activated CLCM composition (i.e., the activated CLCM gel dispersion) refers to a process in which swelled polymer gel particles suspended and spaced apart within a CLCM gel dispersion (having interstitial spaces therebetween, the spaces filled with the colloidal nanosilica and/or temperature-controlled activator) results in a CLCM gel solid composition that is activated with the temperature-controlled activator under formation temperature conditions in which the interstitial spaces between the swelled polymer gel particles are reduced or eliminated.

Accordingly, the present disclosure provides convertible CLCM compositions that convert from a gel dispersion into a rigid, solid gel lost circulation material under formation temperature conditions. The CLCM compositions of the present disclosure can effectively address lost circulation zones ranging from minor lost circulation (seepage-loss lost circulation) to complete fluid loss (severe-loss lost circulation). As used herein, the term "lost circulation zone," and grammatical variants thereof refers to a target zone of interest in which lost circulation occurs. A lost circulation zone may encompass an area encountered during drilling operations where the volume of drilling fluid returning to the surface is less than the volume of drilling fluid introduced to the wellbore.

Advantageously, and as described in detail below, the CLCM compositions, and related methods and systems, are environmentally friendly and can reduce or prevent costs associated with over usage of traditional lost circulation materials. For example, traditional lost circulation materials can separate out of a drilling fluid and fail to reach the desired target zone (lost circulation zone), thus necessitating over compensating the concentration of such materials within a fluid. Differently, the CLCM compositions of the present disclosure operate as a single pumpable, gelled composition that eliminates or mitigates chromatographic separation challenges, thereby reducing costs associated with lost circulation operations.

It is to be appreciated that while the present disclosure discusses lost circulation prevention or reduction using the CLCM compositions of the present disclosure during subterranean formation wellbore drilling operations, other subterranean formations may additionally employ the CLCM compositions described herein, without departing from the scope of the present disclosure. Such operations may include, but are not limited to, completion operations, stimulation operations (e.g., fracturing operations), cementing operations, enhanced oil recovery operations, and the like, and any combination thereof.

Composite Lost Circulation Material Compositions

As provided above, the convertible CLCMs of the present disclosure comprise at least colloidal nanosilica, a temperature-controlled activator, and polymer gel particles.

Colloidal Nanosilica:

The colloidal nanosilica may comprise a nanosilica selected from the group consisting of sodium silicate, calcium silicate, potassium silicate, magnesium silicate, and any combination thereof. In particular embodiments, the colloidal nanosilica comprises at least sodium silicate nanosilica, including only sodium silicate nanosilica. As used herein, the terms "colloidal" or "colloidal solution," and grammatical variants thereof, refers to a mixture of nanoparticles stably (e.g., evenly or substantially evenly) dispersed (distributed) within a solution. The colloidal nanosilica of the present disclosure, accordingly, comprises a colloidal solution of dispersed nanosilica particles within a nanosilica carrier fluid.

The nanosilica particles in the colloidal nanosilica component of the CLCM compositions of the present disclosure may have an average diameter size in the range of about 0.1 nanometers (nm) to about 1000 nm, encompassing any value and subset therebetween, such as in the range of about 500 nm to about 1000 nm, or about 0.1 nm to about 500 nm, or about 1 nm to about 300 nm, or about 10 nm to about 200 nm, or about 10 nm to about 70 nm, or about 20 nm to about 100 nm, or about 30 nm to about 80 nm, or about 40 nm to about 70 nm, or about 40 nm to about 60 nm, or about 40 nm to about 50 nm. In some embodiments, the nanosilica particles in the colloidal nanosilica component of the CLCM compositions of the present disclosure may have an average size in the range of about 1 nm to about 100 nm, encompassing any value and subset therebetween, such as in the range of about 5 nm to about 95 nm, or about 5 nm to about 50 nm, or about 5 nm to about 20 nm, or about 20 nm to about 40 nm, or about 40 nm to about 60 nm, or about 60 nm to about 80 nm, or about 80 nm to about 100 nm. The nanosilica particles in the colloidal nanosilica component of the CLCM compositions described herein may have a particle size distribution, which may be monodisperse or polydisperse.

The shape of the nanosilica particles in the colloidal nanosilica component of the CLCM compositions of the present disclosure is not considered to be particularly limited. For example, the nanosilica particles may be spherical, substantially spherical (i.e., may have uneven surfaces), ovoid, cubic, dendritic, fibrous, or otherwise polygonal in shape. Preferably and in the Examples described herein, the nanosilica particles are spherical, with or without uneven surfaces, to ensure even distribution in the colloidal solution.

The specific surface area of nanosilica particles in the colloidal nanosilica component of the CLCM compositions may be in the range of about 100 square meters per gram ($m^2/g$) to about 500 $m^2/g$, encompassing any value and subset therebetween, such as in the range of about 100 $m^2/g$ to about 300 $m^2/g$, or about 100 $m^2/g$ to about 200 $m^2/g$, or about 100 $m^2/g$ to about 400 $m^2/g$, or about 150 $m^2/g$ to about 200 $m^2/g$.

Without being bound by theory, it is believed that greater surface area of the nanosilica particles can affect the rate of gelation and the nature of the CLCM gel solids formed for lost circulation control. More specifically, smaller particle size of the nanosilica particles in the colloidal nanosilica component (and thus the CLCM gel dispersion) may promote faster gelling.

The nanosilica particles in the colloidal nanosilica component of the CLCM compositions may have a density range of about 1.0 gram per cubic centimeter (g/cc) (equivalent to: gram per milliliter (g/mL)) to about 2.0 g/cc, encompassing any value and subset therebetween, such as in the range of about 1.0 g/cc to about 1.8 g/cc, or about 1.0 g/cc to about 1.7 g/cc, or about 1.0 g/cc to about 1.6 g/cc, or about 1.0 g/cc to about 1.5 g/cc, or about 1.0 g/cc to about 1.4 g/cc, or about 1.05 g/cc to about 1.8 g/cc, or about 1.05 g/cc to or 1.7 g/cc, or about 1.05 g/cc to about 1.6 g/cc, or about 1.05 g/cc to about 1.5 g/cc, or about 1.05 g/cc to about 1.4 g/cc.

Nanosilica particles in the colloidal nanosilica component of the CLCM compositions having the combination of particle size, specific surface area, and density may provide advantageous results, including the ability to form the CLCM gel solid described herein under formation temperature conditions.

The nanosilica particles are present in the CLCM compositions in an amount in the range of about 60 weight percent (wt %) to about 90 wt % of the total CLCM composition, encompassing any value and subset therebetween, such as in the range of about 60 wt % to about 70 wt %, or about 65 wt % to about 75 wt %, or about 70 wt % to about 80 wt %, or about 75 wt % to about 80 wt %, or about 65 wt % to about 70 wt %, or about 70 wt % to about 75 wt %.

The amount of nanosilica particles in the colloidal nanosilica component of the CLCM compositions may affect the rate of formation of the CLCM gel solid to provide lost circulation control in a lost circulation zone(s) in a wellbore in a subterranean formation, where a greater amount of nanosilica particles in the CLCM composition can accelerate the rate of formation of the CLCM gel solid upon activation of the temperature-controlled activator under formation temperature conditions.

The colloidal nanosilica component of the CLCM compositions further comprises a nanosilica carrier fluid to keep the nanosilica particles in colloidal suspension. The nanosilica carrier fluid of the present disclosure may be water including, but not limited to, fresh water, deionized water, treated produced water, treated wastewater, and the like. Depending on the source of the nanosilica particles, they may be obtained (e.g., commercially) already suspended in a carrier fluid (e.g., water) and thus provided as the colloidal nanosilica component.

In one or more aspects, the amount of nanosilica particles in nanosilica carrier fluid of the colloidal nanosilica component of the CLCM compositions of the present disclosure may be in the range of about 40 wt % to about 60 wt % of the colloidal nanosilica component, encompassing any value and subset therebetween, such as in the range of about 40 wt % to about 45 wt %, or 45 wt % to about 50 wt %, or about 50 wt % to about 55 wt %, or about 55 wt % to about 60 wt %.

Temperature-Controlled Activator:

The CLCM compositions described herein further comprise a temperature controlled-activator component, wherein a temperature-controlled activator is suspended or otherwise dissolved in an activator carrier solution. Such temperature-controlled activators, in combination with the colloidal nanosilica, serve to swell the polymer gel particles within the CLCM compositions to form the CLCM gel dispersions, discussed in detail below. Upon activation under formation temperature conditions, the temperature-controlled activators serve to solidify the CLCM gel dispersions to form the CLCM gel solids to act as lost circulation material to control lost circulation.

The temperature-controlled activators are generally liquid fluids that cause destabilization of the colloidal nanosilica in the CLCM gel dispersions at a downhole lost circulation zone location upon activation under formation temperature conditions. As provided above, the destabilization of the colloidal nanosilica may cause the nanosilica particles to collide, drawing the polymer gel particles together to re-associate (e.g., via bonding, chemical or physical, or otherwise being brought into close physical proximity), thereby forming the CLCM gel solid described herein.

The temperature-controlled activators may include, but are not limited to, sodium bicarbonate, potassium chloride, sodium chloride, calcium chloride, magnesium chloride, and any combination thereof.

The temperature-controlled activator component of the CLCM compositions comprise temperature-controlled activators suspended or otherwise dissolved in an activator carrier fluid. The activator carrier fluid of the present disclosure may be water including, but not limited to, fresh water, deionized water, treated produced water, treated wastewater, and the like.

In one or more aspects, the temperature-controlled activators are included in the CLCM compositions suspended in the activator carrier fluid in the range of about 1 wt % to about 40 wt % of the temperature-controlled activator component, encompassing any value and subset therebetween, such as in the range of about 30 wt % to about 35 wt %, or 35 wt % to about 40 wt %, or about 40 wt % to about 45 wt %, or about 45 wt % to about 50 wt %. The amount of temperature-controlled activators may depend on a number of factors including, but not limited to, the formation temperature conditions, introduction (pumping) time into a wellbore, and the like, and any combination thereof.

When multiple temperature-controlled activators are used in forming a single CLCM composition, each temperature-controlled activator may be mixed with one or both of the remaining at least three components of the CLCM composition (i.e., the colloid nanosilica and the polymer gel particles) simultaneously or separately, without departing from the scope of the present disclosure. If the multiple temperature-controlled activators are mixed with only one of the remaining three components, the final of the at least three components is thereafter mixed to form the CLCM composition (and upon swelling, the CLCM gel dispersion).

The temperature-controlled activator component may be present in the CLCM compositions in an amount in the range of about 10 weight percent (wt %) to about 40 wt %, encompassing any value and subset therebetween, such as in the range of about 10 wt % to about 20 wt %, or about 20 wt % to about 30 wt %, or about 30 wt % to about 40 wt %, or about 25 wt % to about 30 wt %, or about 10 wt % to about 15 wt %, or about 15 wt % to about 30 wt %, or about 35 wt % to about 40 wt %.

In one or more embodiments, the temperature-controlled activators may be present in the CLCM compositions of the present disclosure in a weight ratio to the nanosilica particles (i.e., activator:nanosilica) in the range of about 1:1 to about 1:10, encompassing any value and subset therebetween, such as in the range of about 1:1 to about 1:8, or about 1:1 to about 1:5, or about 1:1 to about 1:3, or about 1:1.5 to about 1:2.5, or about 1:1.6 to about 1:2.

The particular amount of temperature-controlled activators may depend upon a number of factors including, but not limited to, the formation temperature conditions (i.e., downhole temperature at the lost circulation zone(s)), the particular temperature-controlled activator selected, the particular nanosilica particles selected, and the like, and any combination thereof.

Moreover, the amount of temperature-controlled activators in the CLCM composition may affect the rate of formation of the CLCM gel solid, where a greater amount of temperature-controlled activators in the CLCM composition can accelerate the rate of formation of the CLCM gel solid upon activation of the temperature-controlled activator under formation temperature conditions.

The temperature-controlled activators may be activated under formation temperature conditions. As used herein, the term "formation temperature conditions," and grammatical variants thereof, refers to a downhole temperature at a lost circulation zone(s) to which the CLCM compositions of the present disclosure are contacted to provide lost circulation control thereto. In one or more aspects, these formation temperature conditions may be, without limitation, up to about 200° C., such as up to about 175° C., up to about 150° C., up to about 125° C., or up to about 100° C., or up to about 90° C., or up to about 40° C., or up to about 30° C. In one or more aspects, the formation temperature conditions may be in the range of about 30° C. to about 200° C., encompassing any value and subset therebetween, such as in the range of about 30° C. to about 50° C., or about 50° C. to about 100° C., or about 100° C. to about 150° C., or about 150° C. to about 200° C., or about 100° C. to about 150° C.

In one or more instances, under the formation temperature conditions, the temperature-controlled activators may be activated over a time period upon exposure to formation temperature conditions at a lost circulation zone to form the CLCM gel solid. This gelation time period must be understood and controlled such that sufficient time is allotted for pumping the CLCM compositions to a desired lost circulation zone. Such gelation time period may be, without limitation, about 10 hours or less, about 5 hours or less, about 1 hour or less, or about 30 minutes or less. In one or more aspects, the time period for forming the CLCM gel solid may be in the range of about 30 minutes to about 16 hours, encompassing any value and subset therebetween, such as in the range of about 30 minutes to about 5 hours, or about 5 hours to about 10 hours, or about 10 hours to about 16 hours. The particular time period for forming the CLCM gel solid at a lost circulation zone will depend on a number of factors including, at least in part, on the particular formation temperature conditions of the contacted lost circulation zone, the concentration of the temperature-controlled activator, the concentration of the colloidal nanosilica, and the like, and any combination thereof.

Polymer Gel Particles:

The CLCM composition further comprises a polymer gel particle component. These polymer gel particles swell upon contact with the remaining components of the CLCM composition, namely the colloidal nanosilica component and the temperature-controlled activator component. As described above, the polymer gel particles are generally spaced apart (i.e., distributed evenly or unevenly throughout the CLCM gel dispersion where inertial spaces between one or more polymer gel particles comprises the colloidal nanosilica and/or temperature-controlled activator). Upon activation of the temperature-controlled activator, the colloidal nanosilica is destabilized, colliding the nanosilica particles of the CLCM composition, and re-associating the swelled polymer gel particles, thereby forming the CLC gel solid lost circulation material described herein.

The polymer gel particles may be a suitable polymer gel particle including, but not limited to, polymer gel particles comprising polyacrylamide, polypropylene glycol, polyacrylate, 2-acrylamido-2-methylpropane sulfonic acid, chitosan, gum (e.g., guar gum, xanthan gum, welan gum), cellulose (e.g., hydroxyl-ethyl-cellulose), starch, and the like, and any combination thereof. These polymer gel particles may be crosslinked with suitable crosslinking agents or otherwise include bonds, such as hydrogen bonds, intermolecular associations through van der Walls bonds, hydrophobic interactions, electrostatic interactions, polymer interchain interactions, and the like.

The polymer gel particles in the polymer gel particle component of the CLCM compositions of the present disclosure may have an average diameter size in the range of about 0.5 millimeters (mm) to about 3 mm, encompassing any value and subset therebetween, such as in the range of about 0.5 mm to about 1 mm, or about 1 mm to about 1.5 mm, or about 1.5 mm to about 2 mm, or about 2 mm to about 2.5 mm, or about 2.5 mm to about 3 mm. The particular average diameter size of the polymer gel particles may depend on a number of factors including, but not limited to, the qualities of the lost circulation zone, such as the size of a fracture or other opening, and the like. The polymer gel particles in the polymer gel particle component of the CLCM compositions described herein may have a particle size distribution, which may be monodisperse or polydisperse.

The shape of the polymer gel particles in the polymer gel particle component of the CLCM compositions of the present disclosure is not considered to be particularly limited. For example, the nanosilica particles may be substantially (i.e., may have uneven surfaces) spherical, ovoid, cubic, dendritic, fibrous, or otherwise polygonal in shape. Preferably, the polymer gel particles are spherical, with or without uneven surfaces, to ensure even distribution in the CLCM gel dispersion.

The polymer gel particles may be present in the CLCM compositions in an amount in the range of about 5 wt % to about 10 wt %, encompassing any value and subset therebetween, such as in the range of about 5 wt % to about 6 wt %, or about 6 wt % to about 7 wt %, or about 7 wt % to about 8 wt %, or about 8 wt % to about 9 wt %, or about 9 wt % to about 10 wt %.

CLCM Gel Dispersion

As provided above, the CLCM compositions are introduced into a wellbore in a subterranean formation and contacted with a lost circulation zone as a CLCM gel dispersion having the at least three main components described herein (including swelled polymer gel particles prior to activation of the temperature-controlled activator). The CLCM gel dispersions are generally liquid with a gel component provided by the swelled polymer gel particles and thus can be pumped into a wellbore as a single fluid or pill.

In one or more aspects of the present disclosure, the density of the CLCM gel dispersion that is contacted with a lost circulation zone may be in the range of about 1 g/cc (g/mL) to about 5 g/cc, encompassing any value and subset therebetween, such as in the range of about 1 g/cc to 4.5 g/cc, or about 1 g/cc to about 4 g/cc, or about 1 g/cc to about 3.5 g/cc, or about 1 g/cc to about 3 g/cc, or about 1 g/cc to about 2.5 g/cc, or about 1 g/cc to about 2 g/cc, or about 1 g/cc to about 1.5 g/cc.

In one or more aspects of the present disclosure, the viscosity of the CLCM gel dispersion that is contacted with a lost circulation zone may be in the range of about 1 centipoise (cP) to about 50 cP at room temperature (i.e., about 20° C. to about 25° C.) and without or with low shear, encompassing any value and subset therebetween, such as in the range of about 1 cP to about cP, or 1 cP to about 20 cP, or about 1 cP to about 15 cP, or about 1 cP to about 10 cP, or about 1 cP to about 5 cP.

Methods and Systems for Lost Circulation using Composite Lost Circulation Materials In one or more embodiments, the components of the CLCM composition may be mixed to form the CLCM gel dispersion and the CLCM gel dispersion may be introduced into a wellbore in a subterranean formation such that the CLCM gel dispersion contacts one or more lost circulation zones. Subsequently, the temperature-controlled activator in the temperature-controlled activator component is activated under formation temperature conditions at the lost circulation zone(s). Activation of the temperature-controlled activator results in the formation of a CLCM gel solid from the reaction of the colloidal nanosilica in the CLCM gel dispersion and the temperature-controlled activator, thereby reducing the rate of lost circulation or wholly preventing lost circulation in the lost circulation zone(s).

Accordingly, embodiments in accordance with the present disclosure include the use of a CLCM composition during drilling operations to control lost circulation of drilling fluids. As described, above, other subterranean formation operations requiring lost circulation control are also applicable to the embodiments of the present disclosure.

Referring to FIG. 1, illustrated is an exemplary drilling system 100 that may employ the principles of the present disclosure. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure. As illustrated, the drilling system 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. It is to be appreciated that all or a portion of wellbore 116 may be vertical (as shown), horizontal, or deviated, without departing from the scope of the present disclosure.

At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). One or more chemicals, fluids, or additives may be added to the drilling fluid 122 via a mixing hopper 134 communicably coupled to or otherwise in fluid communication with the retention pit 132.

The drilling system 100 may further include a bottom hole assembly (BHA) 136 arranged in the drill string 108 at or near the drill bit 114. The BHA 136 may include any of a number of sensor modules 138 (one shown) which may include formation evaluation sensors and directional sensors, such as measuring-while-drilling and/or logging-while-drilling tools. These sensors are well known in the art and are not described further. The BHA 136 may also contain a mud pulser system 140 which induces pressure fluctuations in the mud flow. Data from the downhole sensor modules 138 are encoded and transmitted to the surface via the pulser system 140 whose pressure fluctuations, or "pulses," propagate to the surface through the column of mud flow in the drill string 108. At the surface the pulses are detected by one or more surface sensors (not shown), such as a pressure transducer, a flow transducer, or a combination of a pressure transducer and a flow transducer.

If one or more lost circulation zones are encountered during a drilling operation (e.g., loss of drilling fluid to the surface), the CLCM composition of the present disclosure may be introduced to the identified lost circulation zone. The CLCM composition may be introduced by adding a first non-flow-through packer at a downhole location of the lost circulation zone and a flow-through packer at an uphole location of the lost circulation zone, thereby isolating the lost circulation zone. The drill string 108 (which may include coiled tubing) is introduced through the flow-through packer and the CLCM composition introduced therethrough to contact the lost circulation zone.

Figure 2A:
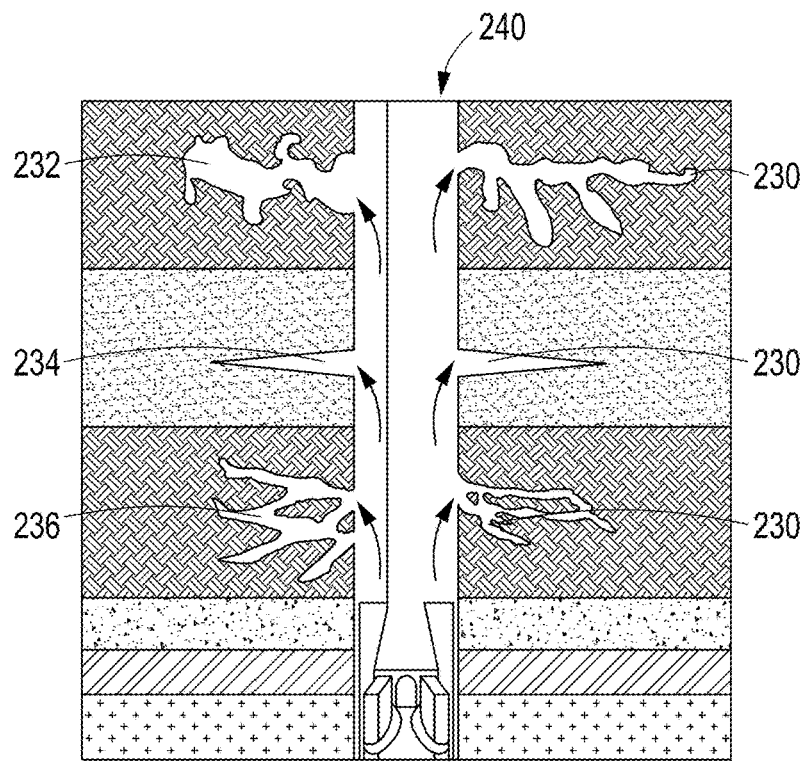
FIG. 2A is a schematic drawing of a subterranean formation showing lost circulation zones.
Figure 2B:
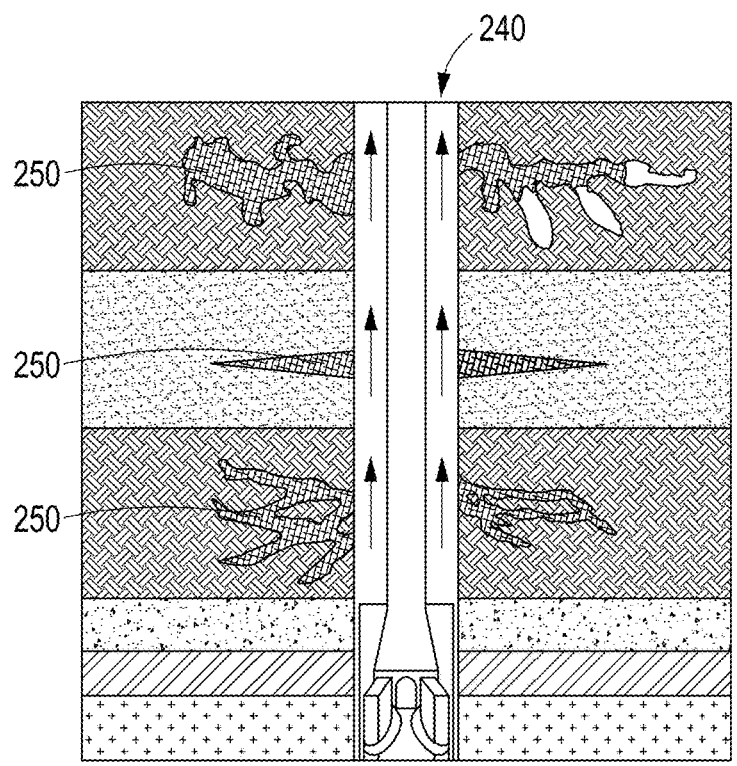
FIG. 2B is a schematic drawing of the subterranean formation of FIG. 2A with introduction of the CLCM compositions prior to activation of the temperature-controlled activator, in accordance with one or more embodiments of the present disclosure.

With reference to FIGS. 2A and 2B, a hydrocarbon well is illustrated during a drilling operation, which may comprise any of the components and systems described with continued reference to FIG. 1. To recover hydrocarbons within the subterranean formation, a wellbore 240 is drilled within the subterranean formation to establish fluid contact with hydrocarbon bearing zones of the subterranean formation (see FIG. 1). However, during drilling of the wellbore 240, various lost circulation zones 230 may be encountered. Such lost circulation zones 230 may include, but are not limited to, fractures, voids, vugulars, gaps, permeable channels, cavities, cavernous openings, the like, and any combination thereof. As shown in FIG. 2A, lost circulation zones 230 of FIG. 2A (and FIG. 2B) include cavernous openings 232, induced fractures 234, and natural fractures 236. Cavernous opening 232 may be a large hollow void in the subterranean formation which would readily allow drilling fluid to enter and be diverted from returning to the surface through the annulus (see FIG. 1). Induced fractures 234 are areas of cracking or increased permeability in the subterranean formation resulting from aspects of the drilling operation. For example, elevated pressure in the wellbore 240 from pumping of drilling fluid may result in separation of layers and opening of channels according to the natural stresses within the formation. Similarly, natural fractures 236 include separation of layers and channels throughout the formation resulting from natural geological movement and stress relief within the formation. It is to be appreciated that each of cavernous openings 232, induced fractures 234, and natural fractures 236 (among other permeability openings) present challenges to drilling operations as the drilling fluid may be diverted into the these lost circulation zones 230 instead of being returned via the annulus.

The lost circulation zones 230 of the subterranean formation may be sequestered from the wellbore 240 by introduction of the CLCM compositions (i.e., the CLCM gel dispersion) into any one or all of the lost circulation zones 230 in the subterranean formation which create lost circulation control upon contact with the formation temperature as described herein. FIG. 1A provides an illustration of the subterranean formation prior to treatment in accordance with methods of the present disclosure and FIG. 1B provides an illustration of the lost circulation zones 230 obstructed with the CLCM compositions 250 upon activation of the temperature-controlled activator to form the CLCM gel solid.

Forming a barrier to overcome lost circulation in a subterranean formation involves injecting the CLCM compositions (i.e., the CLCM gel dispersions) in accordance with the present disclosure into one or more lost circulation zones in a subterranean formation. It will be appreciated that the CLCM compositions may be injected into the lost circulation zones 230 (FIG. 2A) in accordance with methods and techniques familiar to those skilled in the art for placement of drilling within the fractures or cavernous formations of a subterranean formation to impede lost circulation. In one or more embodiments, the CLCM compositions, as described herein, may be injected into the lost circulation zones via drill string or coiled tubing (or production tubing) placed downhole prior to activation of the temperature-controlled activator. The CLCM compositions may further be directed to the lost circulation zones for lost circulation control with the placement of bridge plugs, packers, or other devices to direct or obstruct flow, as described above.

Figure 2C:
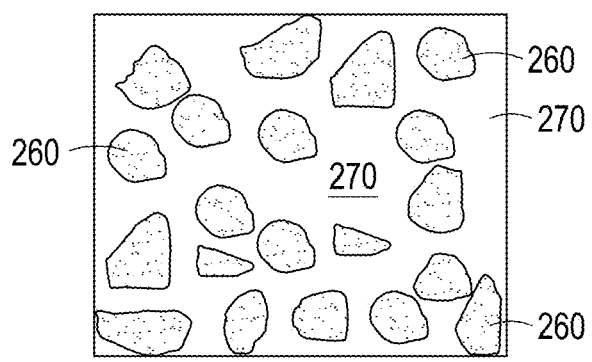
FIG. 2C is a schematic drawing of the CLCM compositions described herein prior to activation of the temperature-controlled activator, in accordance with one or more embodiments of the present disclosure.

Referring now to FIG. 2C and with continued reference to FIG. 2A and FIG. 2B, illustrated is a schematic drawing of the CLCM compositions 250 (FIG. 2B) introduced into a lost circulation zone 230 (FIG. 2A). As shown, the polymer gel particles 260 are swelled and interstitial spaces between the polymer gel particles 260 comprise a mixture 270 of both the colloidal nanosilica component and the temperature-controlled activator component of the CLCM composition. Upon contact with appropriate formation temperature conditions, the interstitial spaces between the swelled polymer gel particles 260 becomes reduced or eliminated due to activation of the temperature-controlled activator and resultant collision of the nanosilica, as described herein.

Embodiments disclosed herein include:

Embodiment A: A method comprising: pre-mixing a composite lost circulation material (CLCM) composition, wherein the CLCM composition comprises: a colloidal nanosilica component, the colloidal nanosilica component comprising nanosilica particles and a nanosilica carrier fluid; a temperature-controlled activator component, the temperature-controlled activator comprising a temperature-controlled activator and an activator carrier fluid; and polymer gel particles, wherein the pre-mixing causes the polymer gel particles to swell; introducing the CLCM composition to a zone of interest in a subterranean formation via a wellbore, the zone of interest comprising a lost circulation zone; and heating the CLCM composition at the zone of interest under formation temperature conditions, thereby activating the temperature-controlled activator in the temperature-controlled activator component and forming a gelled solid to mitigate the flow of fluids from the wellbore into the subterranean formation at the zone of interest.

Embodiment B: A composite lost circulation material (CLCM) composition comprising: a colloidal nanosilica component, the colloidal nanosilica component comprising nanosilica particles and a nanosilica carrier fluid; a temperature-controlled activator component, the temperature-controlled activator comprising a temperature-controlled activator and an activator carrier fluid, wherein the temperature-controlled activator is activatable under formation temperature conditions at a zone of interest in a wellbore in a subterranean formation; and polymer gel particles.

Embodiment C: A system comprising: a wellbore in a subterranean formation comprising a zone of interest; a pre-mixed composite lost circulation material (CLCM) composition disposed at the zone of interest, the CLCM composition comprising: a colloidal nanosilica component, the colloidal nanosilica component comprising nanosilica particles and a nanosilica carrier fluid; a temperature-controlled activator component, the temperature-controlled activator comprising a temperature-controlled activator and an activator carrier fluid, and wherein the temperature-controlled activator activates under formation temperature conditions at the zone of interest; and polymer gel particles.

Each of embodiments A, B, and C may have one or more of the following additional elements in any combination:

Element 1: wherein the nanosilica particles are selected from the group consisting of sodium silicate, calcium silicate, potassium silicate, magnesium silicate, and any combination thereof.

Element 2: wherein the nanosilica particles have an average diameter size in the range of about 0.1 nanometers to about 1000 nanometers.

Element 3: wherein the nanosilica particles are present in the CLCM composition in an amount in the range of about 60 wt % to about 90 wt %.

Element 4: wherein the nanosilica particles are present in the colloidal nanosilica component in an amount in the range of about 40 wt % to about 60 wt %.

Element 5: wherein the temperature-controlled activator is selected from the group consisting of sodium bicarbonate, potassium chloride, sodium chloride, calcium chloride, magnesium chloride, and any combination thereof.

Element 6: wherein the temperature-controlled activator is present in the temperature-controlled activator component in an amount in the range of about 30 wt % to about 50 wt %.

Element 7: wherein the polymer gel particles are selected from the group consisting of polyacrylamide, polypropylene glycol, polyacrylate, 2-acrylamido-2-methylpropane sulfonic acid, chitosan, gum, cellulose, starch, and any combination thereof.

Element 8: wherein the polymer gel particles have an average diameter size in the range of about 0.5 millimeters to about 3 millimeters.

Element 9: wherein the polymer gel particles are present in the CLCM composing in the range of about 5 wt % to about 10 wt %.

Element 10: wherein the formation temperature condition is in the range of about 30° C. to about 200° C.

By way of non-limiting example, exemplary combinations applicable to A, B and C include any one, more, or all of Elements 1-10 in any combination.

To facilitate a better understanding of the aspects of the present disclosure, the following examples of preferred or representative aspects are given. In no way should the following examples be read to limit, or to define, the scope of the disclosure.

EXAMPLES

Example 1

Figure 3A:
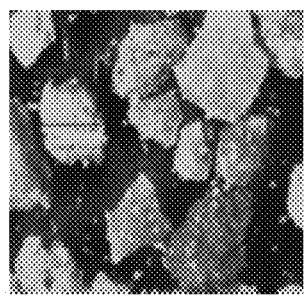
FIGS. 3A-3C illustrate various stages of the preparation and formation of the CLCM compositions, in accordance with one or more embodiments of the present disclosure.
Figure 3B:
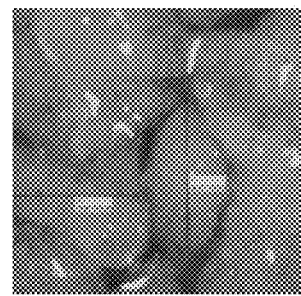
Figure 3C:
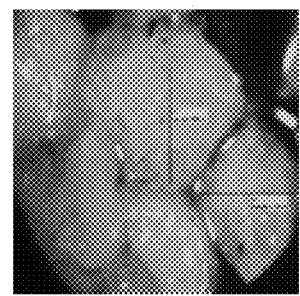

In this Example, a CLCM composition was prepared comprising polymer gel particles having an average diameter of about 500 μm, a colloidal nanosilica (40% nanosilica of sodium silicate in fresh water), and a temperature-controlled activator of sodium silicate solution (30% activator). The dry polymer gel particles are shown in FIG. 3A; the swelled polymer gel particles are shown in FIG. 3B upon inclusion of the colloidal nanosilica and temperature-controlled activator and swelled to an average diameter of about 1,500 μm (i.e., the CLCM gel dispersion); and FIG. 3C shows the CLCM composition after activation of the temperature-controlled activator at 40° C. As shown in FIG. 3C, the interstitial spaces between the swelled polymer gel particles in FIG. 3B have been reduced or eliminated.

Example 2

Figure 4:
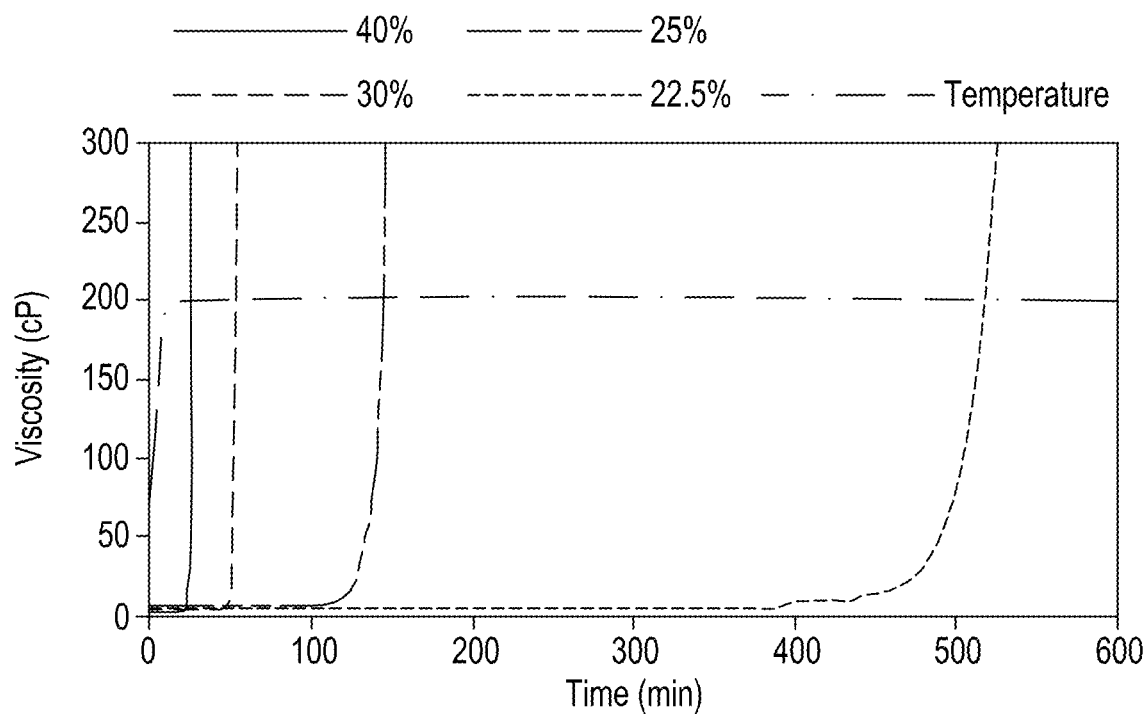
FIG. 4 is a chart showing gelation time of CLCM compositions as a function of temperature-controlled activator concentration, in accordance with one or more embodiments of the present disclosure.

In this Example, a viscometer was used to evaluate the gelation time of the CLCM compositions of the present disclosure upon activation of the temperature-controlled activators of the present disclosure. In this Example, the CLCM compositions of Example 1 were evaluated with varying concentrations of temperature-controlled activator. Specifically, the temperature-controlled activator compositions were tested at 22.5 wt %, 25 wt %, 30 wt %, and 40 wt % at 210° F. (98.9° C.) over a 600-minute time period. The results are shown in FIG. 4. As shown, the change in temperature-controlled activator concentration significantly affects the gelation time. With the same concentration of colloidal nanosilica component and polymer gel particle component, increasing the temperature-controlled activator concentration can be used to control activation time to form the CLCM gel solids for lost circulation control.

Example 3

Figure 5:
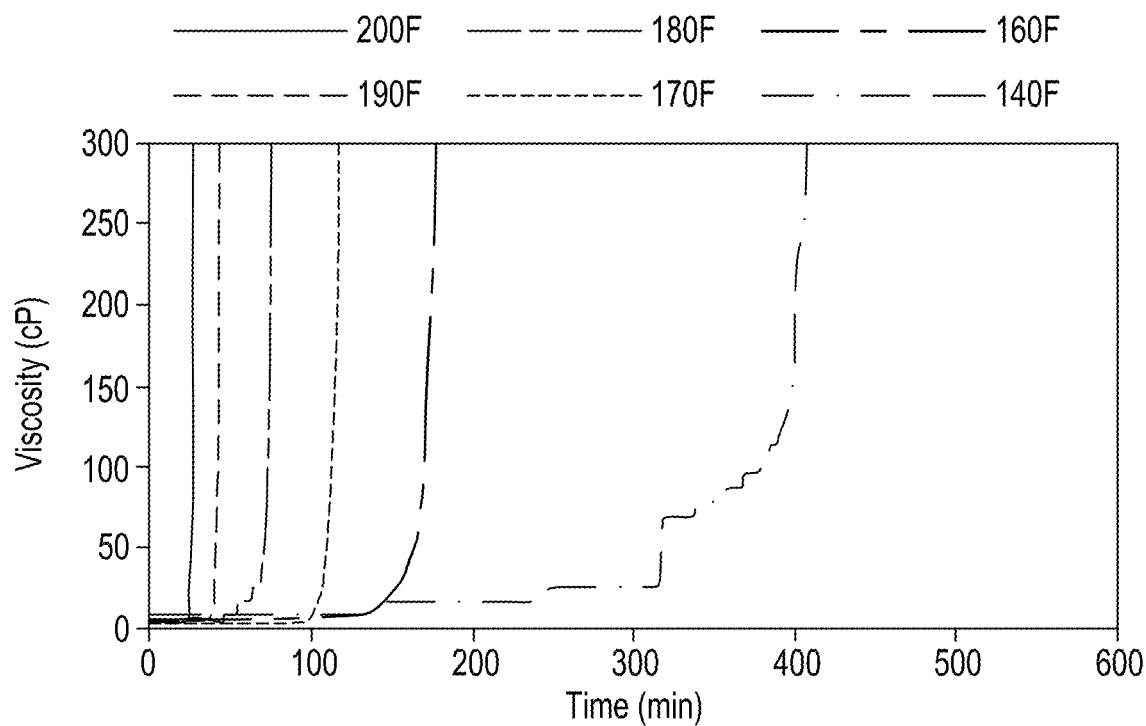
FIG. 5 is a chart showing gelation time of CLCM compositions as a function of formation temperature conditions, in accordance with one or more embodiments of the present disclosure.

In this Example, a viscometer was used to evaluate the gelation time of the CLCM compositions of the present disclosure upon activation of the temperature-controlled activators of the present disclosure. In this Example, the CLCM compositions of Example 1 were evaluated with 40 wt % concentration of temperature-controlled activator. Specifically, the temperature-controlled activator compositions were tested at 40 wt % over a 600-minute time period at temperatures of 140° F. (60° C.), 160° F. (71.1° C.), 170° F. (76.7° C.), 180° F. (82.2° C.), 190° F. (87.8° C.), and 200° F. (93.3° C.). The results are shown in FIG. 5. As shown, the change in formation temperature conditions significantly affects the gelation time. Increasing the formation temperature conditions decreases gelation time and can be used to control activation time to form the CLCM gel solids for lost circulation control. Without being bound by theory, increased temperature lowers the zeta potential of the CLCM composition, causing the colloidal nanosilica to collide to for the CLCM gel solids as described herein.

Example 4

Figure 6:
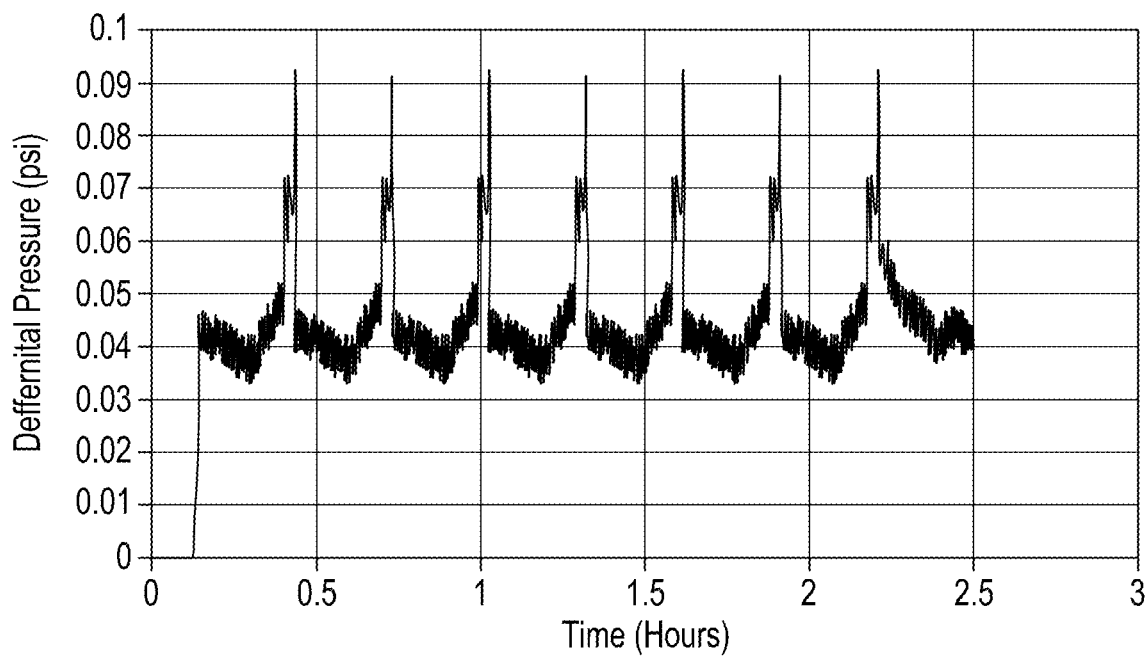
FIG. 6 is a chart showing differential pressure of a fracture in a core sample using only water (comparative).

In this Example, a core flooding test was performed to determine the injection pressure and plugging capacity of the CLCM compositions upon gelation to control lost circulation. Prior to introduction of the CLCM composition (as prepared according to Example 1), a 1-inch diameter core sample of carbonate (with low permeability) was prepared with a 1-mm induced fracture across the diameter. Initial injection pressure of water only was evaluated through the fractured core and the measured differential pressure of 0.04 psi, as shown in FIG. 6, is fairly low due to the presence of the fracture.

Figure 7:
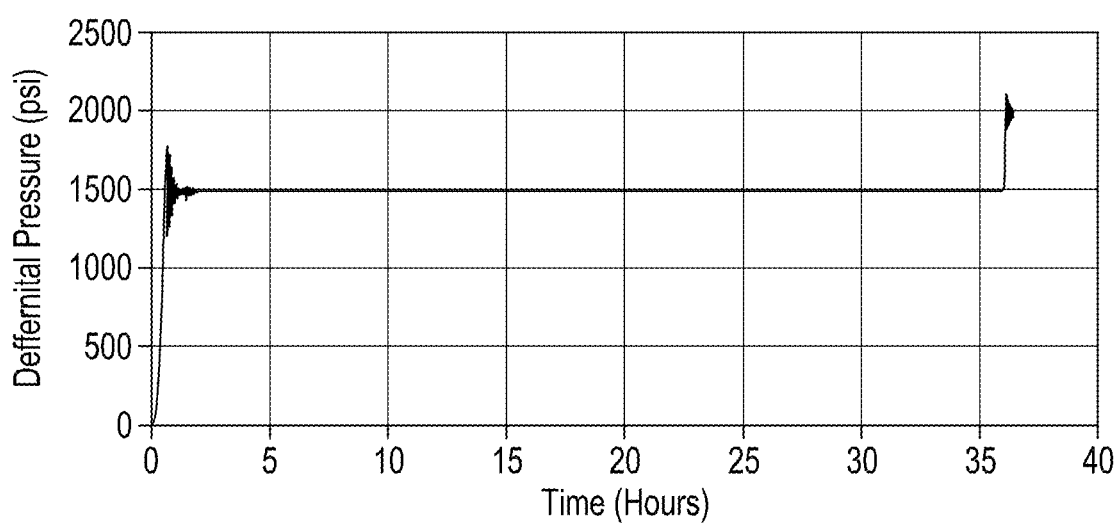
FIG. 7 is a chart showing differential pressure of a fracture in a core sample using the CLCM compositions described herein, in accordance with one or more embodiments of the present disclosure.

Thereafter, the core flooding test was performed using the same core upon introduction of the CLCM composition of Example 1 and at a temperature of 200° F. (93.3° C.). The results are shown in FIG. 7. As shown, the CLCM compositions showed, after a brief period of time, the differential pressure drastically increased, indicating plugging of the fracture. The results of FIG. 7 extended a constant pressure at 1,500 psi for more than 35 hours with no sign of water break through. After about 35 hours, the pressure was increased to 2,000 psi with no sign of water break through.

Figure 8A:
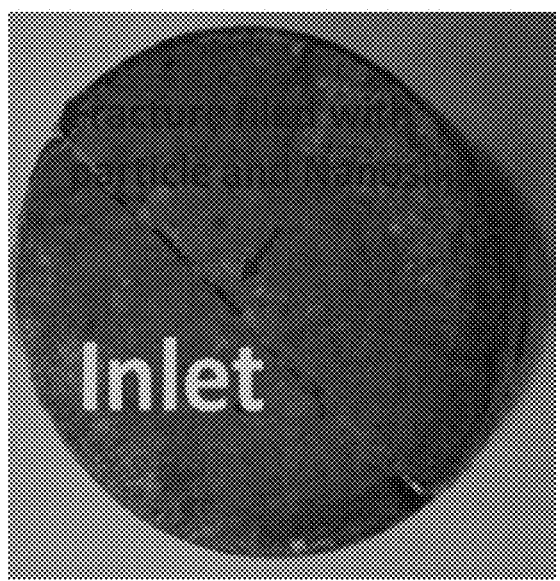
FIGS. 8A and 8B show inlet and outlet fractures of the core sample evaluated in FIG. 7, in accordance with one or more embodiments of the present disclosure.
Figure 8B:
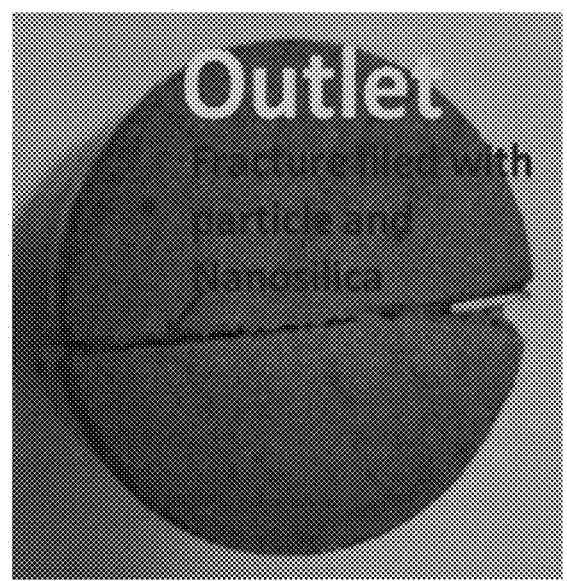

The core sample after treatment with the CLCM compositions and tested (FIG. 7), the inlet (FIG. 8A) and outlet (FIG. 8B) were visually observed. As shown, both the inlet and outlet of FIGS. 8A and 8B, respectively, exhibit core efficient plugging.

Example 5

Figure 9:
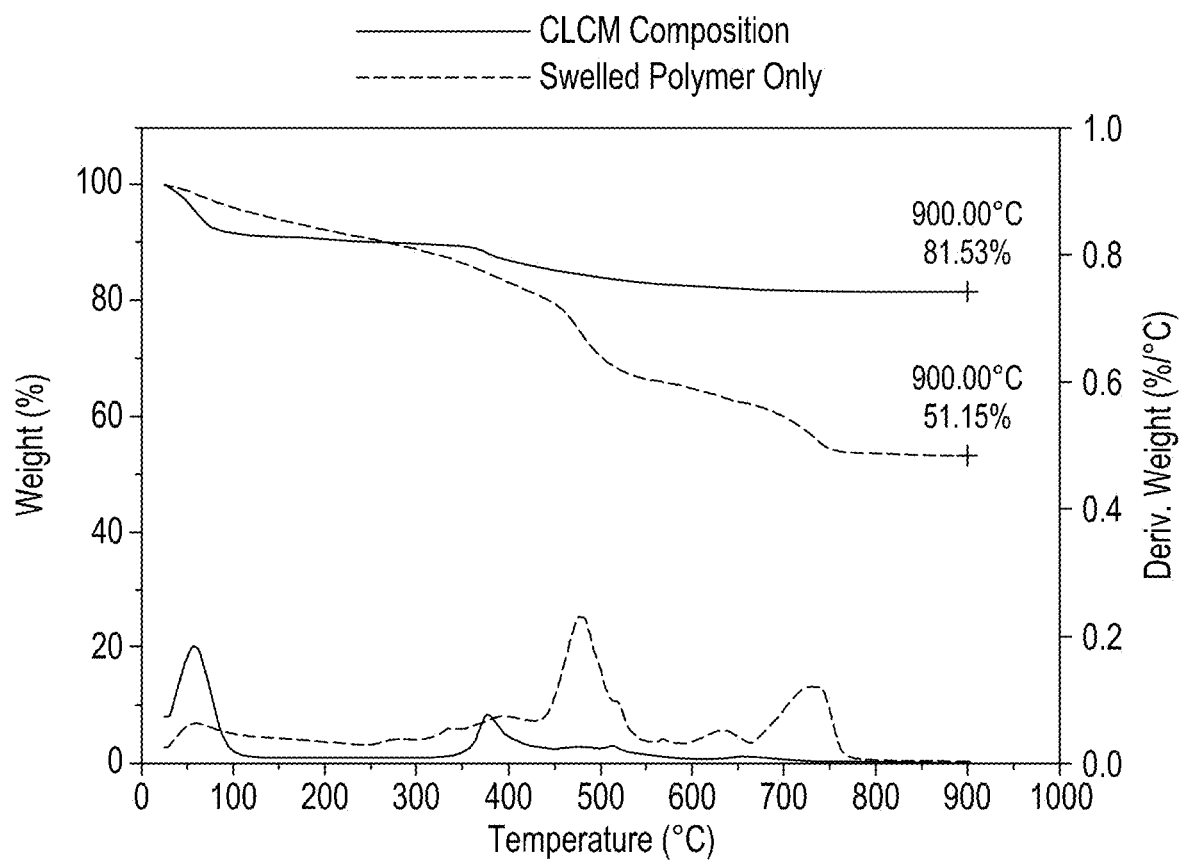
FIG. 9 shows TGA results of a CLCM composition of the present disclosure compared to a comparative swelled polymer in water only composition.

In this Example, thermogravimetric analysis (TGA) was performed for polymer gels swelled in water with a 40% sodium silica solution and 60% of colloidal silica and compared to a CLCM composition prepared according to Example 1. The results are shown in FIG. 9. As provided in FIG. 9, weight losses in the first region between 25-300° C. can be attributed to the loss of moisture and light volatile hydrocarbon materials while the weight loss in the second region between 300-600° C. can be attributed to the decomposition of degradable inorganic ingredients and/or the evaporation of heavier hydrocarbon. The semi-quantitative results indicate that the total weight losses (TWL) of the samples are approximately 47 wt % for the polymer gels swelled in water only and 18 wt % for the CLCM compositions of the present disclosure, while the residual masses were found to be approximately 53 wt % and 82 wt %, respectively.

Example 6

Figure 10:
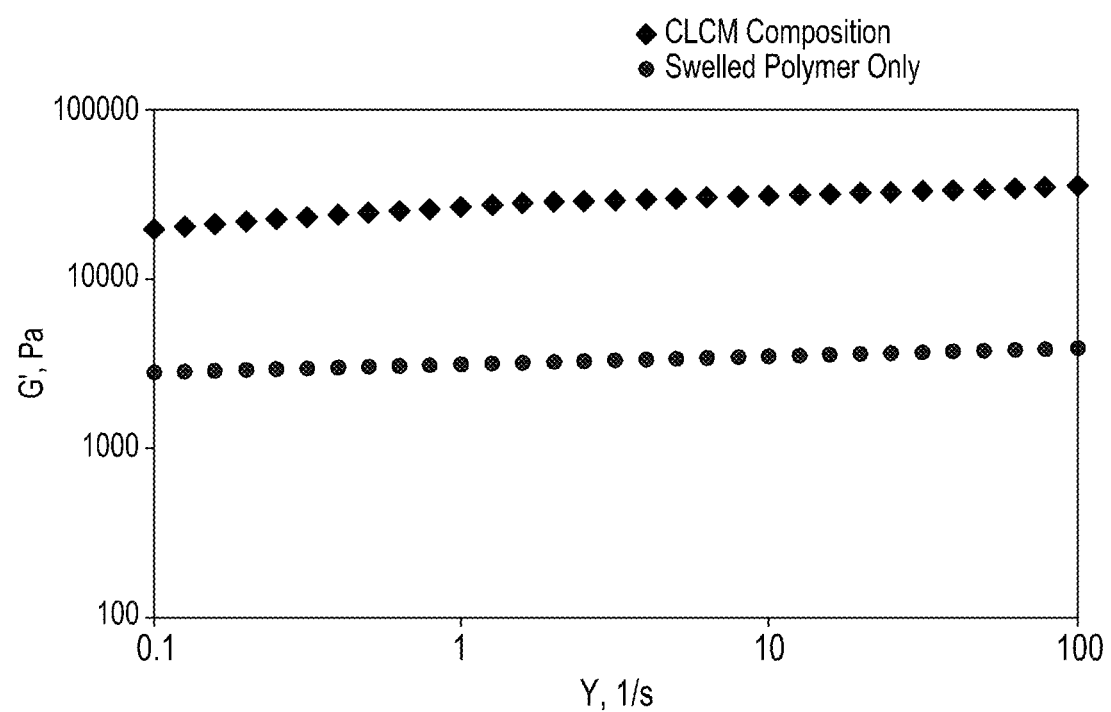
FIG. 10 shows DMA results of a CLCM composition of the present disclosure compared to a comparative swelled polymer in water only composition.

In this Example, dynamic mechanical analysis (DMA) performed to determine elasticity (G') of polymer gels swelled in water with a 40% sodium silica solution and 60% of colloidal silica, compared to a CLCM composition prepared according to Example 1, as a function of shear rate (Y). The results are shown in FIG. 10. As shown in FIG. 10, the CLCM composition showed enhanced elasticity compared to the polymer gels swelled in water only.

Accordingly, the present disclosure provides compositions, methods, and systems for effective lost circulation control during drilling and other operations within a subterranean formation using a CLCM composition comprising a colloidal nanosilica component, a temperature-controlled activator component, and a polymer gel particle component.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as concentration, temperatures, and so forth used in the present specification and associated claims are to be understood as being modified in all instances by the term "about." As used herein, the term "about" encompasses+/−

5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

Terms of orientation are used herein merely for purposes of convention and referencing and are not to be construed as limiting. However, it is recognized these terms could be used with reference to an operator or user.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method comprising:
providing a pre-mixed composite lost circulation material (CLCM) composition comprising:
a colloidal nanosilica component comprising nanosilica particles and a nanosilica carrier fluid, wherein the nanosilica particles are present in the pre-mixed CLCM composition in an amount in a range of about 60 wt % to about 90 wt %;
a temperature-controlled activator component comprising a temperature-controlled activator and an activator carrier fluid; and
5 wt % to 10 wt % polymer gel particles;
wherein the polymer gel particles swell in the pre-mixed CLCM composition and are spaced apart therein; and
wherein the polymer gel particles are polyacrylamide, polypropylene glycol, polyacrylate, chitosan, guar gum, xanthan gum, welan gum, hydroxyethylcellulose, starch, or any combination thereof;
introducing the pre-mixed CLCM composition to a zone of interest in a subterranean formation via a wellbore during a drilling operation, the zone of interest comprising a lost circulation zone; and
heating the pre-mixed CLCM composition at the zone of interest under formation temperature conditions;
wherein the heating activates the temperature-controlled activator in the temperature-controlled activator component to form a gelled solid having decreased interstitial space between the polymer gel particles than in the pre-mixed CLCM composition, the gelled solid mitigating fluid flow from the wellbore into the subterranean formation at the zone of interest.

2. The method of claim 1, wherein the nanosilica particles are selected from the group consisting of sodium silicate, calcium silicate, potassium silicate, magnesium silicate, and any combination thereof.

3. The method of claim 1, wherein the nanosilica particles have an average diameter size in a range of about 0.1 nanometers to about 1000 nanometers.

4. The method of claim 1, wherein the nanosilica particles are present in the colloidal nanosilica component in an amount in a range of about 40 wt % to about 60 wt %.

5. The method of claim 1, wherein the temperature-controlled activator is selected from the group consisting of sodium bicarbonate, potassium chloride, sodium chloride, calcium chloride, magnesium chloride, and any combination thereof.

6. The method of claim 1, wherein the temperature-controlled activator is present in the temperature-controlled activator component in an amount in a range of about 30 wt % to about 50 wt %.

7. The method of claim 1, wherein the polymer gel particles have an average diameter size in a range of about 0.5 millimeters to about 3 millimeters.

8. The method of claim 1, wherein the formation temperature conditions are in a range of about 30° C. to about 200° C.

9. A system comprising:
a wellbore in a subterranean formation comprising a zone of interest;
a pre-mixed composite lost circulation material (CLCM) composition disposed at the zone of interest during a drilling operation, the pre-mixed CLCM composition comprising:
a colloidal nanosilica component comprising nanosilica particles and a nanosilica carrier fluid, wherein the nanosilica particles are present in the pre-mixed CLCM composition in an amount in a range of about 65 wt % to about 90 wt %;
a temperature-controlled activator component comprising a temperature-controlled activator and an activator carrier fluid,
wherein the temperature-controlled activator activates under formation temperature conditions at the zone of interest; and
5 wt % to 10 wt % polymer gel particles;
wherein the polymer gel particles swell in the pre-mixed CLCM composition and are spaced apart therein; and
wherein the polymer gel particles are polyacrylamide, polypropylene glycol, polyacrylate, chitosan, guar gum, xanthan gum, welan gum, hydroxyethylcellulose, starch, or any combination thereof.

* * * * *